United States Patent [19]

Lee

[11] Patent Number: 4,763,816
[45] Date of Patent: Aug. 16, 1988

[54] MEASURING AND DISPENSING DEVICE

[76] Inventor: Sang W. Lee, 102 W. Pembrey Dr., Wilmington, Del. 19803

[21] Appl. No.: 18,694

[22] Filed: Feb. 25, 1987

Related U.S. Application Data

[63] Continuation-in-part of Ser. No. 236, Jan. 2, 1987.

[51] Int. Cl.$^4$ .............................................. B67D 37/00
[52] U.S. Cl. .................................... 222/207; 222/211; 222/212
[58] Field of Search ............... 222/206, 207, 211, 212, 222/443, 456, 464, 481, 547, 564; 239/327, 354

[56] References Cited

U.S. PATENT DOCUMENTS

| | | | |
|---|---|---|---|
| 890,018 | 6/1908 | Burt | 222/456 X |
| 2,989,216 | 6/1961 | Moro-Lin | 222/211 X |
| 3,178,081 | 4/1965 | Adams | 222/211 X |
| 3,224,652 | 12/1965 | Ladwig et al. | 222/443 X |
| 3,648,903 | 3/1972 | Marchant | 222/212 |
| 4,091,966 | 5/1978 | Laauwe | 222/211 |
| 4,286,735 | 9/1981 | Sneider | 239/327 X |

Primary Examiner—Charles A. Marmor
Attorney, Agent, or Firm—Stephen F. K. Yee

[57] ABSTRACT

A device is disclosed for measuring and dispensing a fixed quantity of material having a material measuring and dispensing assembly disposed within a flexible container. The assembly includes a measuring cup extending adjacent to the bottom of the container with an opening for entry of the material, an air chamber disposed adjacent to the mouth of the container and formed with a nozzle for discharge of the material, and a tube connecting the cup and chamber. At least one opening is provided in the air chamber having a valve associated therewith which operates automatically to block the opening when the dispenser is inverted and to unblock the opening when the dispenser is upright. The dispenser is inverted and squeezed to dispense the quantity of material in the measuring cup, the opening being blocked by the valve to prevent flow of material therethrough. When the dispenser is upright, the valve unblocks the opening to permit air flow into the container and to permit refilling of the measuring cup. The dispenser is easily used with one hand, and the assembly is removable to permit refilling of the container.

15 Claims, 2 Drawing Sheets

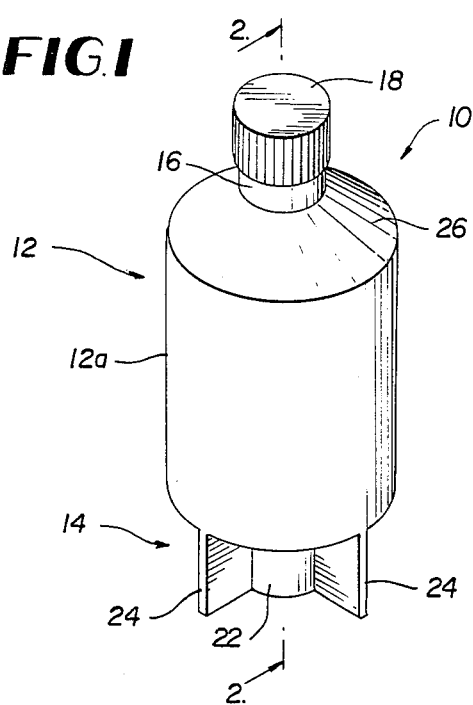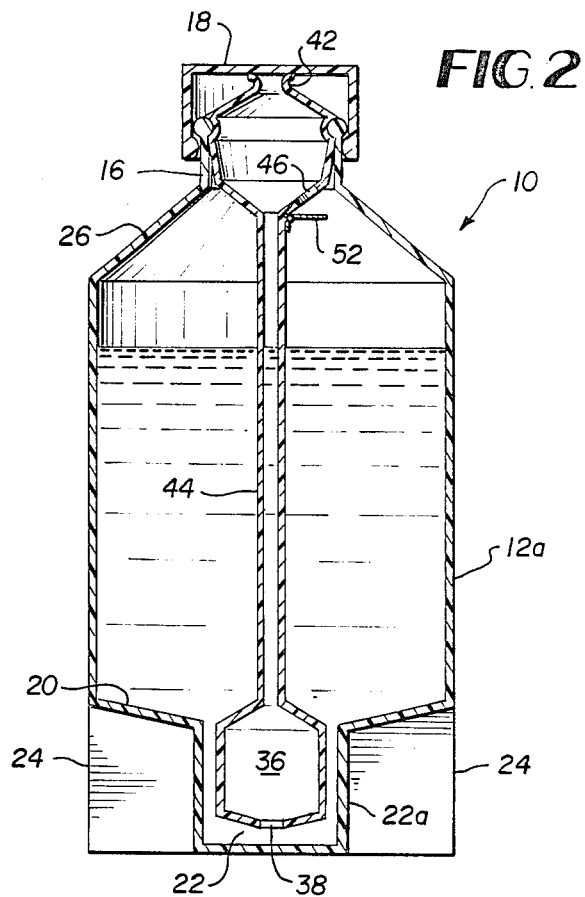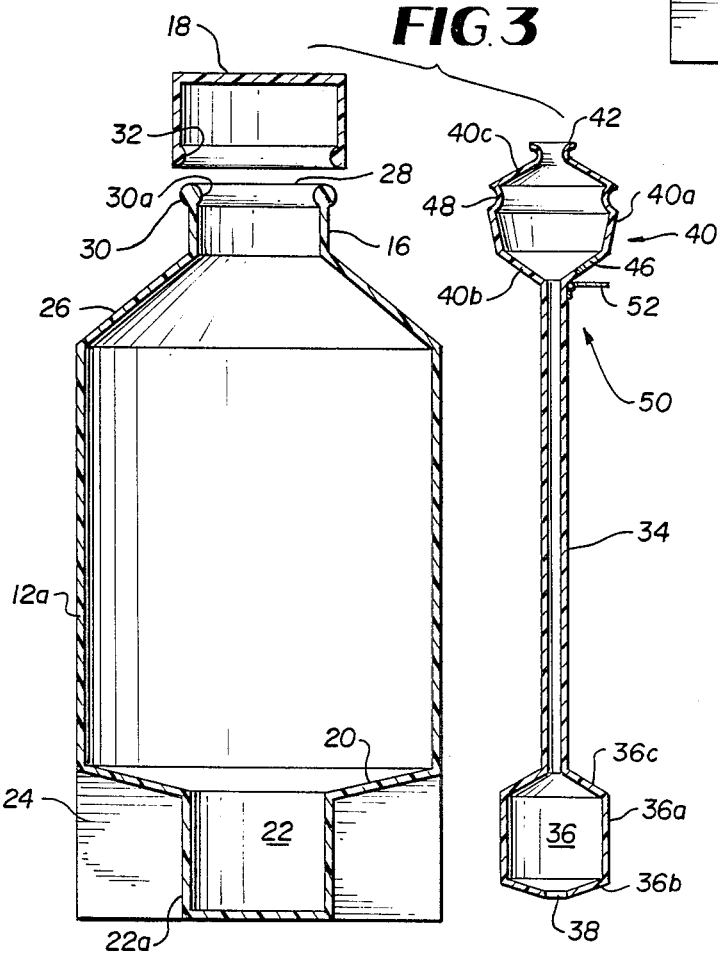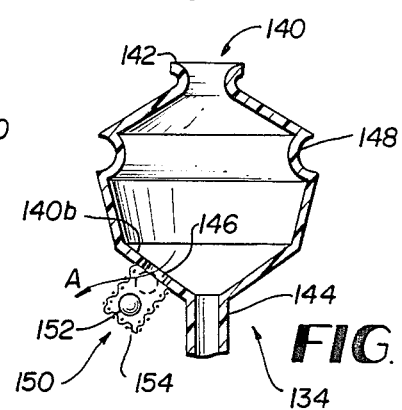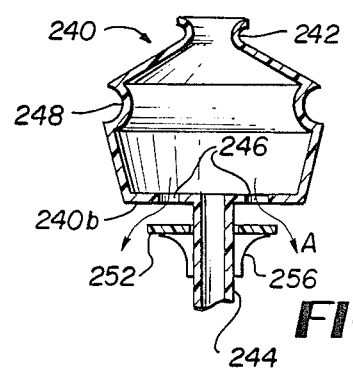

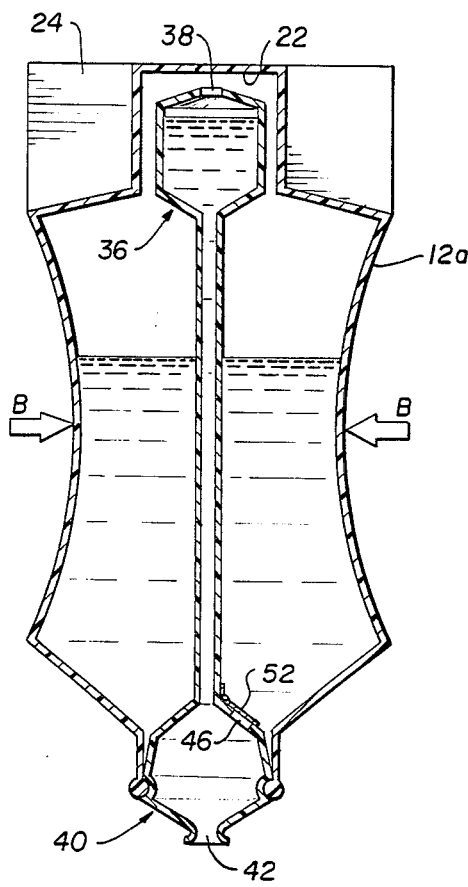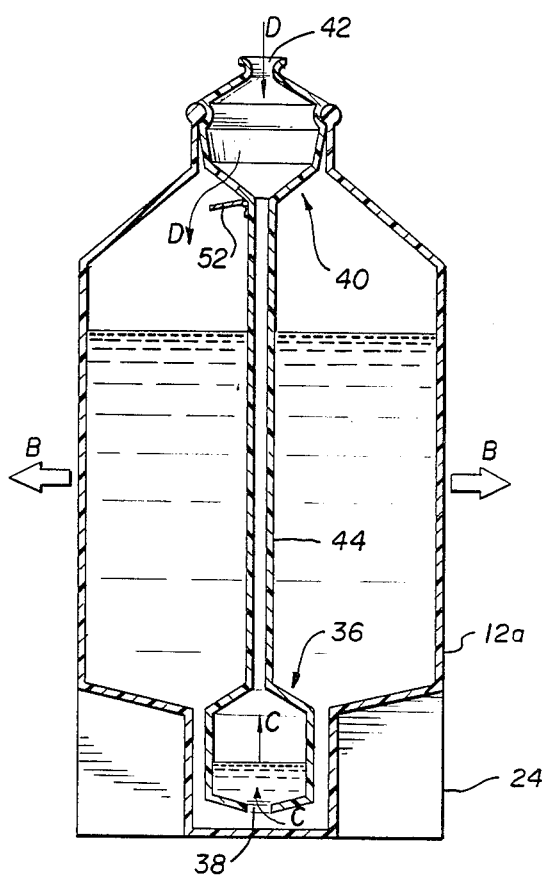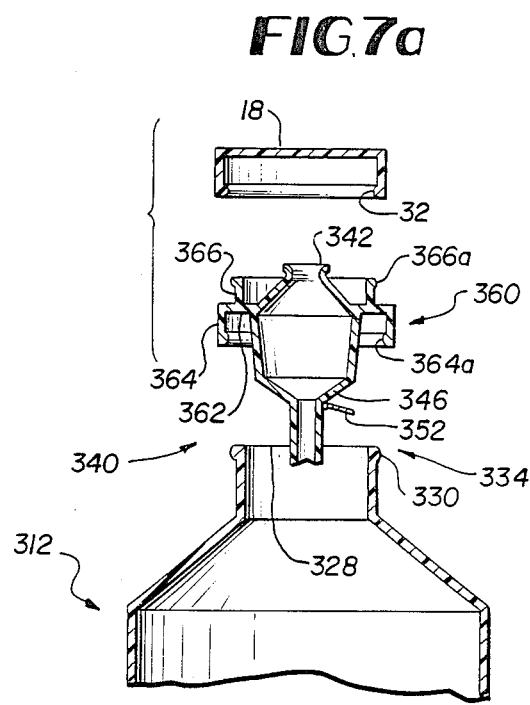

MEASURING AND DISPENSING DEVICE

CROSS-REFERENCE TO RELATED APPLICATION

This application is a continuation-in-part of Applicant's co-pending application Ser. No. 000,236, filed on Jan. 2, 1987.

BACKGROUND OF THE INVENTION

1. Field of the Invention

This invention relates to dispensers in general and, more particularly, to a squeeze-type dispenser operable with one hand for measuring and dispensing a pre-determined quantity of the contents.

2. Description of the Prior Art

Dispensers for dispensing a measured or predetermined quantity are known in the art, and include containers which are rigid and those which are flexible, or squeezeable. When these dispensers are inverted or squeezed, a fixed quantity of the contents is dispensed from the container. Returning the container to its upright position, or releasing pressure on the flexible container, resets the dispenser for the next use.

Examples of dispensers which use a flexible or squeeze-type container are described in the following U.S. Pat Nos.:

2,989,216: Moro-Lin
3,363,808: Gorman
3,628,700: Donoghue
4,106,673: Donoghue
4,261,488: Bennett For various reasons, these prior-art dispensers have shortcomings. Moro-Lin and Donoghue ('700), for instance, use containers which are sealed after being filled with the contents; the containers are not refillable. Gorman's device produces a spray or mist, and the metering apparatus does not consistently provide an accurately-measured quantity each time it is squeezed. The apparatus of Donoghue ('673) includes a cup for receiving the dispensed liquid, but does not provide means for dispensing an accurately-measured quantity of the liquid.

In Applicant's aforementioned co-pending application, the disclosure of which is incorporated herein by reference, a squeeze-type dispenser is disclosed in which a measuring-and-dispensing assembly is rotatably disposed within a flexible container. The assembly includes a measuring cup extending adjacent to the bottom of the container and having an opening for entry of the contents, an air chamber disposed adjacent to the mouth of the container and formed with a nozzle for discharge of the contents, and a hollow delivery tube joining the cup to the chamber. Openings are spaced around the periphery of the air chamber, and the container neck adjacent to the chamber is provided with a plurality of radial tabs or protrusions which, by rotation of the assembly relative to the container, can be selectively positioned adjacent to the openings in the air chamber to block the openings and prevent air flow therethrough. After blocking the openings, the dispenser is inverted and squeezed to dispense the quantity of contents in the measuring cup. The dispenser is uprighted, and the assembly rotated to unblock the openings, thereby permitting air flow into the container and refilling of the measuring cup.

The Applicant's aforesaid dispenser represents an advancement over similar types of known dispensers, but requires a two-handed operation. The present invention provides an improvement over this dispenser, and requires only one hand for its operation.

SUMMARY OF THE INVENTION

Accordingly, among the objects of the present invention are to provide: an improved dispenser having a squeeze-type container which consistently dispenses an accurately-measured, predetermined quantity of the contents in the container; an improved dispenser of the foregoing type which is refillable, and which will dispense substantially all of the contents; an improved dispenser of the foregoing type which is easily used with one hand and does not result in messy dripping of the contents; and a dispenser of the foregoing type having improved pressure equalizing control means which operate automatically to provide accurate measurement and dispensing of the contents.

These and other objects of the invention are achieved in a dispenser having a flexible, squeeze-type container for holding the contents and a measuring-and-delivery assembly removably disposed within the container. The assembly includes a measuring cup extending adjacent to the bottom of the container and having an opening for entry of the contents, and an air chamber disposed adjacent to the mouth of the container and formed with a nozzle for discharge of the contents, with a tube joining the cup to the chamber. At least one opening is provided in the air chamber, the blockage of which is automatically controlled by a valve. When the dispenser is inverted and squeezed to dispense the quantity of contents in the measuring cup, the valve blocks the opening to prevent flow of the contents therethrough. When the container is upright, the valve unblocks the openings to permit air flow into the container through the air chamber to permit refilling of the measuring cup.

A better understanding and appreciation of the foregoing description, as well as other objects, features and advantages of the invention can be obtained from the following description of presently-preferred embodiments, when considered in conjunction with the accompanying drawings.

BRIEF DESCRIPTION OF THE DRAWINGS

FIG. 1 is a perspective view of the dispenser of the present invention.

FIG. 2 is an elevational, sectional view of the dispenser, as seen along line 2—2 in FIG. 1.

FIG. 3 is an exploded view, showing the components of the dispenser in elevational section.

FIGS. 4 and 5 are elevational, sectional views of the dispenser, illustrating the dispensing of the contents and refilling for the next dispensing.

FIGS. 6a–6b show alternate embodiments of the air chamber.

FIGS. 7a–7c show further modifications of the air chamber configuration.

DETAILED DESCRIPTION OF THE PREFERRED EMBODIMENTS

Referring now to the drawings, wherein the same or similar reference numerals designate the same or similar elements in each of the several views, FIG. 1 shows an assembled dispenser 10 of the present invention, which includes a container 12 having at least a flexible sidewall 12a, a base 14 and a neck 16 closed by a cap or cover 18. As shown in FIGS. 2 and 3, base 14 has a downwardly-sloped bottom surface 20 terminating in a centrally-disposed well 22 with a vertical, cylindrical wall 22a. Supports or legs 24 are provided on base 14 to support the dispenser in a stable, upright position.

The upper portion of container 12 includes a conically-shaped top 26 terminating in cylindrical neck 16 and a mouth 28. A radial ridge or rim 30 extends circumferentially around the exterior edge of mouth 28, and cooperates with a similarly-configured peripheral bead 32 located adjacent to the inner, open edge of cap 18 to permit the cap to be snapped over the mouth to close container 12. Alternatively, the container neck and cap may have conventional cooperating screw-type threads, as shown in FIG. 7b, c. The inner edge of mouth 28 has a peripheral bead 30a, the purpose of which will be described below.

An assembly 34 for measuring a predetermined quantity of material and delivering it from container 12, shown in FIG. 3 removed from the container, includes a hollow measuring cup 36 having an entry 38 at one end and an air chamber 40 with a nozzle 42. A hollow tube 44 connects measuring cup 36 and air chamber 40 to provide fluid communication between these elements. Assembly 34 may conveniently be formed as an integral unit, as shown in the drawings, or may be formed from separate cup, tube and chamber elements joined to form a substantially fluid-tight connection between these elements.

As shown in the drawings, measuring cup 36 may have a cylindrical sidewall 36a, an inwardly and downwardly tapered lower surface 36b through which entry 38 extends, and a conically-shaped upper surface 36c which merges into the lower end of tube 44. Air chamber 40 has a substantially cylindrical sidewall 40a tapering downwardly into a downwardly-sloped lower surface or floor 40b and an upwardly-flared upper surface or ceiling 40c merging with nozzle 42. At least one hole 46 penetrates lower surface 40b of the air chamber. Multiple holes such as 46 may be spaced on lower surface 40b. Air chamber 40 is provided with a peripheral exterior groove 48 adjacent to the upper end of upper surface 40c, which cooperates with interior bead 30a on container mouth 28 to support assembly 34 in container 12 and to provide a fluid seal against leakage of the contents when the container is inverted.

A valve 50 is associated with hole 46 to regulate the flow of air through the air chamber, and includes a valve element 52 pivotally supported by conventional means (not shown) on floor 40b for free movement of the valve element. In the upright position of assembly 34, valve element 52 falls away from hole 46 to unblock the hole. When assembly 34 is inverted, valve element 52 falls against hole 46, and is biased by the weight of the contents in container 12 and by the pressure of the container being squeezed, to block the hole, as described more fully below. Valve element 52 may be provided with stop means (not shown) which coact with floor 4b and/or the pivotal support means to limit the element's downward movement. A sealing element (not shown), such as a peripheral gasket or a layer of resilient material, may be attached to the surface of valve element 52 which contacts floor 40b to improve sealing of hole 46. Alternatively, valve element 52 may be of a resilient material to enhance sealing. If more than one hole is provided in the air chamber, each hole has a valve to control flow therethrough.

As shown in FIG. 2, when assembly 34 is inserted into container 12 and ridge 30a snaps into groove 48, measuring cup 36 extends into well 22, with a clearance between the cylindrical, exterior surface of the cup and the inner surface of well wall 22a to permit flow of the contents of the container into the measuring cup via entry 38. The length of tube 44 is selected to suspend the lower end surface 36b of measuring cup 36 above the floor of well 22 to provide easy entry of the contents into the cup. The longitudinal dimension of air chamber 40 is selected such that the chamber is substantially coextensive with neck 16 of container 12.

With assembly 34 removed from container 12, the material to be dispensed is charged into the container, to a suitable height to leave an air space above the level of the material (FIG. 2). Assembly 34 is installed in container 12 by placing the measuring cup 36 into well 22 and snapping air chamber 40 onto interior bead 30a. Pressure from the weight of the material forces some of the material through entry 38 in the bottom of the measuring cup 36 (arrow C, FIG. 5), to fill the cup and tube 44, up to a level substantially equal to the height of the material in container 12. Closure cap 18 is snapped over nozzle 42 and container 12 to preclude entry of foreign matter into air chamber 40. As shown in the condition of FIG. 2, dispenser 10 is ready for use.

In use, cap 18 is removed and dispenser 10 inverted and, as shown in FIG. 4, measuring cup 36 is filled with the material to be dispensed. In the inverted position, valve element 52 is automatically biased against opening 46 by the weight of the valve itself and the weight of the contents within the container. Squeezing sidewall 12a in the direction indicated by arrows B applies positive pressure to the air space in the container 12, above the level of the material therein and to the material itself, to force the material in the measuring cup 36 down through the delivery tube 44 and into air chamber 40, from which the material is discharged through nozzle 42. Pressure from the squeezing of the container further aids in maintaining valve element 52 against opening 46. Closure of opening 46 by valve 50 prevents material flow through air chamber 40, which would affect the quantity of material dispensed. After the content of measuring cup 36 has been completely discharged, indicated by the discharge of air from nozzle 42, dispenser 10 is turned upright and valve element 52 automatically falls away from opening 46, as shown in FIG. 5, unblocking the opening.

Releasing pressure on sidewall 12a permits the flexible sidewall to return to its normal configuration, in the direction of arrows B in FIG. 5, thus creating a negative pressure condition within container 12. Air is drawn into air chamber 40 through nozzle 42, and into container 12 through opening 46, into the space above the container contents, as shown by arrows D in FIG. 5. The resulting atmospheric pressure on the free surface of the contents, plus the weight of the contents, causes material to enter measuring cup 36 through entry 38 (arrows C, FIG. 5), filling the measuring cup and tube 44, up to the level of the contents in container 12. Dispenser 10 is again ready for use.

In addition to the weight of the valve itself, releasing pressure on the sidewall of the container and the resulting pressure differential across opening 46 further assist in displacing valve element 52 away from the opening, thus assuring a free flow of air through chamber 40.

The amount of material dispensed each time may vary very slightly due to different levels of the remaining material in the container and the delivery tube after each use. To minimize this variation, the inside diameter of tube 44 is made very small, thus reducing the volume of material within the tube. The tube diameter can be sized such that the variation is acceptable, even when dispensing liquid which requires more accurate volume control, such as medicine, etc. As a comparison, dispensing medicine by a teaspoon (5,000 mm$^3$) can vary as much as 1.4%.

In addition to discharging the contents and controlling air flow into the container for quick, accurate refilling of the measuring cup, the air chamber also serves as a reservoir. Since the diameter of the delivery tube is very small, as noted above, even the slightest squeeze of the upright container may result in an accidental discharge of the material through the nozzle, creating an undesirable situation if other provisions are not made. The air chamber, being in fluid communication with the delivery tube, acts as a reservoir to receive the material accidentally squeezed from the tube, returns it to the container, and thus prevents the unintended discharge of material from the dispenser.

A first alternate embodiment of the measuring and dispensing assembly, denoted by 100-series numerals, is shown in FIG. 6a, in which only the upper portion of the assembly 134 is shown. All other components of the dispenser are identical to dispenser 10 described above, except the configuration of valve 150 has been changed. Valve 150 is embodied as a caged ball valve having a ball element 152 freely movable in a cage 154 formed of bar-like elements, as shown, or similar construction which affords free passage of the contents through opening 146. Cage 154 is secured to floor 140b of air chamber 140 to permit ball element 152 to move freely against (shown by dotted lines) and away from (shown by the solid lines) opening 146, to close and open the opening. A dispenser incorporating valve 150 operates in all respects identically to the dispenser 10 described above. To enhance sealing of opening 146, ball element 152 may be made of a resilient material or be covered with a layer of resilient material. As a further modification, floor 140b of the air chamber may be oriented horizontally, as described below with respect to FIG. 6b, instead of at an angle.

A second alternate embodiment of the measuring and dispensing assembly is shown in FIG. 6b, identified with 200-series reference numerals. The lower surface or floor 240b of air chamber 240 is configured substantially horizontally, rather than at an angle as in air chambers 40 or 140. A plurality of holes 246 (two visible in FIG. 6b) are spaced in floor 240b, preferably in a circular configuration. A washer-type valve element 252, centrally apertured to fit over tube 244, is disposed beneath floor 240b and moves vertically with respect to the tube. An annular flange 256 is supported by tube 244, below floor 240b, to restrict the downward movement of valve element 252. The diameter of the central aperture of the valve element is dimensioned to provide free movement of the element relative to tube 244 and still ensure that openings 246 are closed in a fluid-tight manner when the valve element is positioned thereagainst. To further ensure fluid-tight sealing, the surface of valve element 252 (the upper surface in FIG. 6b) which bears against the lower surface of floor 240b may be provided with annular gaskets, a resilient layer, or similar sealing element (not shown).

With the dispenser in its upright position, valve element 252 falls away from openings 246 in the air chamber, stopped by flange 256. In this position, unrestricted air flow (arrow A) is possible through the openings in the air chamber. When the dispenser is inverted, valve element 252 is biased against openings 246 in the air chamber by its own weight, the weight of the material in the container, and by the additional pressure caused by squeezing of the container.

Other modifications may be made to the dispenser of the present invention. As an example, instead of having a bead on the inner surface of container mouth coacting with a groove on the exterior surface of the air chamber, a twist cap arrangement may be used, such as shown in FIG. 7a, in which air chamber 340 is provided with a two-part cap, or container closure, 360, having a stepped configuration in elevational section and attached to the air chamber by an annular flange 362. Cap 360 has a lower cylindrical section 364 extending downwardly from flange 362 and an upper cylindrical section 366 extending upwardly from the flange, the diameter of the lower section being larger than the upper section. Cylindrical section 364 has a bead or ridge 364a extending along the inner circumference of the open, lower edge of the section, and a similar bead or ridge 366a extends along the exterior periphery of the upper, open end of the upper cylindrical section 366. The upper and lower sections of cap 360 are sized such that when assembly 334 is placed within container 312, lower cylindrical section 364 snaps over mouth 328 of the container, with the bead 364a frictionally slipping over the bead 330 on the container mouth, and the cover 18 then snaps over the bead 366a on the upper section 366 of the cap, to close the dispenser. Pushing up on an edge of the cap will remove it from the container.

While any of the foregoing designs and alternate embodiments may be provided in new containers embodying the concepts of the present invention, the measuring and dispensing assembly disclosed herein may be readily modified for use with existing container designs. One such modification is shown in FIG. 7b, in which the sidewall 40a' of air chamber 40' is configured vertically, and sized to fit snugly within the neck of existing dispensing containers, represented by 16'. This modification eliminates the need for coacting bead 30a and groove 48, and provides a good fluid seal to prevent leakage of the contents past the sides of the air chamber.

To assist in the removal of the assembly 34' from container 12', the upper, exterior surface of air chamber 40' may be provided with flat, planar tabs or wings 66, as shown in FIG. 7c. Pushing on the surfaces of tabs 66 will tilt assembly 34' relative to container 12, and facilitate removal of the assembly from the container to permit filling thereof.

As shown in FIGS. 7b, c, instead of the bead-type snap closures described above, cap 18' may have conventional screw-closures type threads 68 which coact with similar threads 70 on container neck 16' to secure the cap onto the dispenser.

The combination of the downwardly inclined bottom surface of the container, the well extending below the elevation of the bottom surface, and the positioning of the measuring cup into the well, almost to the bottom thereof, with the entry located in the lower surface of the measuring cup, permits substantially all the contents in the container to be dispensed, thus reducing waste and the necessity for frequent refilling of the container.

The size of the container, measuring and discharging assembly, diameter of the delivery tube, nozzle size, and other components of the dispenser are appropriately sized for the material to be dispensed. While liquids may be ideally dispensed with the present invention, other materials such as powder and fine granules, also may be dispensed.

The dispenser may be made of any suitable material, and may conveniently be molded from a plastic material such as polypropylene. Various modifications may be made. For example, instead of separate supports or legs being used at the base of the container, a solid base may be provided. Rather than using snap-type attachment means for the closure cap, twist cap and the container neck, other types of attachment may be used, such as screw-type threads.

Although preferred embodiments and modifications of the present invention have been described, it is to be understood that further modifications and variations may be made by those skilled in the art in view of the teachings of the present invention without departing from the spirit of the invention, and such modifications and variations are considered to be within the purview and scope of the invention as defined by the appended claims.

What is claimed is:

1. A device for dispensing a measured quantity of material, comprising:
   a container for receiving the material and having a flexible sidewall portion; and
   an assembly for measuring a predetermined quantity of material and discharging the material when the flexible sidewall portion of the container is squeezed, the assembly being receivable within the container and including:
      measuring means adapted to be positioned adjacent to the container bottom for measuring a predetermined quantity of the material and having an orifice for entry of the material from the container;
      a chamber adapted to be positioned adjacent to the container top and having an outlet for discharging the measured quantity of material from the container;
      a gravity-actuated opening in the chamber wall for fluid communication between the interior of the chamber and the interior of the container;
      a valve associated with the opening and having an element movable relative to the opening to block and unblock the opening; and
      a tube interconnecting and providing fluid communication between the measuring means and the chamber to permit delivery of the measured quantity of material from the measuring means to the chamber,
   the valve element positionable against the opening in the chamber to block the opening and prevent air flow therethrough when the container is in an inverted attitude, and away from the opening to permit air flow therethrough when the container is in an upright attitude, the valve controlling air flow through the opening to permit refilling of the measuring means.

2. A device as defined in claim 1, further comprising means for removably supporting the assembly in the container.

3. A device as defined in claim 2, wherein said valve comprises a plate element pivotally supported for movement against and away from said opening.

4. A device as defined in claim 2, wherein said valve comprises a spherical element disposed in a cage-type housing and movable against and away from said opening.

5. A device as defined in claim 2, wherein said valve comprises an annular disk centrally apertured to receive said tube and movable along said tube, against and away from said opening.

6. A device as defined in claim 5, further comprising a plurality of openings in said chamber wall, said annular disk movable against and away from, said openings.

7. A device as defined in claim 6, further including stop means on said tube to limit movement of said disk along said tube.

8. A dispenser for dispensing a measured quantity of material when the dispenser is inverted and squeezed, comprising:
   a container for receiving the material and having a flexible sidewall portion;
   an assembly for measuring a predetermined quantity of material and discharging the material from the container when the flexible sidewall portion of the container is squeezed, the assembly being receivable within the container and including:
      measuring means adapted to be positioned adjacent to the container bottom for measuring a predetermined quantity of the material and having an orifice for entry of the material from the container;
      a chamber adapted to be positioned adjacent to the container top and having an outlet for discharging the measured quantity of material from the container;
      an opening in the chamber for fluid communication between the interior of the chamber and the interior of the container;
      a valve assembly associated with the opening and having a gravity-actuated element movable relative to the opening to block and unblock the opening; and
      a delivery tube interconnecting and providing fluid communication between the measuring means and the chamber to permit delivery of the measured quantity of material from the measuring means to the chamber,
   the valve element positionable against the opening in the chamber to block the opening and prevent air flow therethrough when the container is in an inverted attitude, and away from the opening to permit air flow therethrough when the container is in the upright attitude, the valve assembly controlling air flow through the opening to permit refilling of the measuring means.

9. A dispenser as defined in claim 8, further comprising means for removably supporting the assembly in the container.

10. A dispenser as defined in claim 9, wherein said valve assembly comprises a plate element pivotally supported for movement against and away from said opening.

11. A dispenser as defined in claim 9, wherein said valve assembly comprises a spherical element disposed in a cage-type housing and movable against and away from said opening.

12. A dispenser as defined in claim 9, wherein said valve assembly comprises an annular disk centrally apertured to receive said tube and movable along said tube, against and away from said opening.

13. A dispenser as defined in claim 9, further including stop means on said tube to limit movement of said disk along said tube.

14. A dispenser as defined in claim 13, further comprising a plurality of openings in said chamber wall, said annular disk movable against and away from said openings.

15. A dispenser as defined in claim 9, wherein said container has a portion of the bottom surface recessed below the elevation of the bottom surface to define a well for receiving said measuring means, and a removable cover fits over said chamber outlet to close said container and said chamber discharge outlet.

* * * * *